Aug. 30, 1932.  H. C. LORD  1,874,557

LEVER MOUNTING

Filed Oct. 20, 1930

INVENTOR.
Hugh C. Lord

Patented Aug. 30, 1932

1,874,557

UNITED STATES PATENT OFFICE

HUGH C. LORD, OF ERIE, PENNSYLVANIA

LEVER MOUNTING

Application filed October 20, 1930. Serial No. 489,807.

The present invention is designed to improve lever mechanisms, particularly gear shift levers. Such levers as ordinarily arranged are fulcrumed on a universal joint permitting the rocking of the lever forward and back and crosswise. One method of accomplishing this is to mount the lever in a yielding fulcrum, such as a rubber fulcrum that will permit this movement and also yield under the thrust. In some joints, such as rubber, the tendency of the joint to permit the turning of the lever on its own axis is objectionable, particularly as many of these levers are bent to bring the operating end of the handle into a more convenient position. Such a joint is illustrated in my Patent #1,824,090, issued Sept. 22, 1931, in which one method of locking the lever against turning on its axis is shown. The present invention is particularly designed to prevent this turning movement of the lever on its own axis, at the same time permitting a free rocking movement of the lever in any direction. Features and details of the invention will appear from the specification and claims.

A preferred embodiment of the invention is illustrated in the accompanying drawing as follows:—

Figure 1:
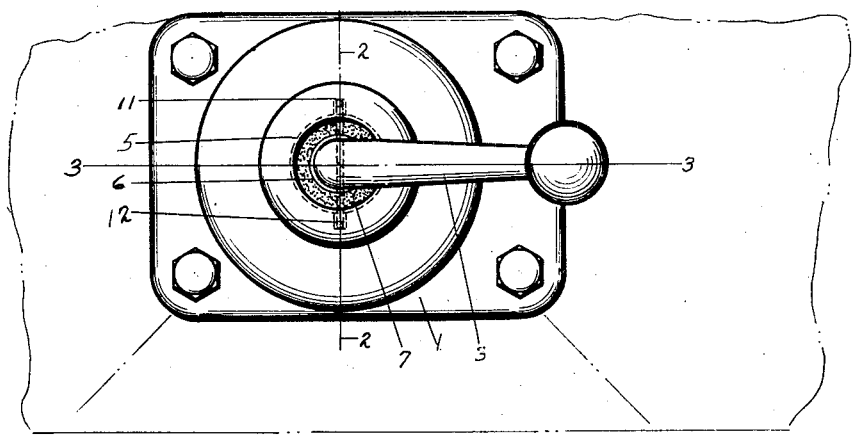

Fig. 1 shows a plan view of the lever and its support.

Figure 2:
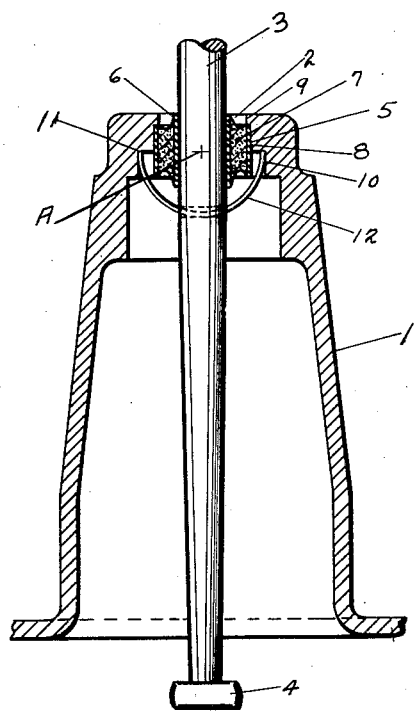

Fig. 2 a section on the line 2—2 in Fig. 1.

Figure 3:
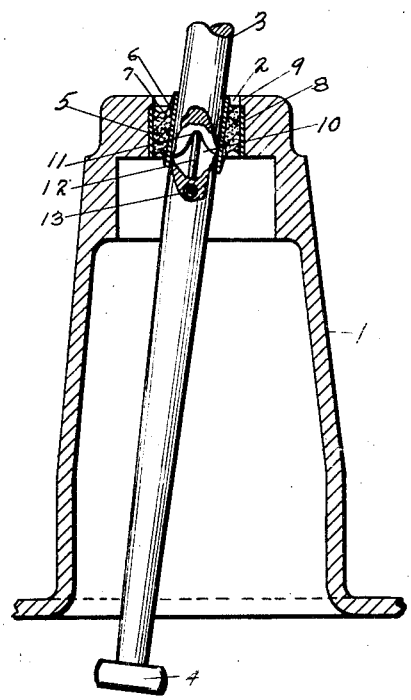

Fig. 3 a section on the line 3—3 in Fig. 1.

1 marks the support, or standard, usually an inverted cup shape, having sufficient size to permit the movement of the lever and at the same time providing the fulcrum support for the lever. This is provided with an opening 2 through which a lever 3 extends. The lever is provided with the usual operating end 4.

The fulcrum joint has an outer shell 5, an inner sleeve 6 into which the lever is pressed, and an intervening wall of rubber 7 which may be, and preferably is, bonded to the outer shell and to the central sleeve. The support has an opening 8 into which the shell 5 is pressed and this opening terminates in a shoulder 9 against which the shell is bottomed.

A V-shaped notch 10 at each side of the opening terminates in a seat 11. A curved pin 12, having a center of oscillation A as a center, is slidingly mounted in an opening 13 through the lever 3. The ends of the pin 12 bottom on the seats 11. The seats 11 are abreast the oscillating center A.

In operation when the lever is moved crosswise, this movement is accommodated by the sliding of the lever on the pin, the curve of the pin accommodating this movement. When the lever is moved forward and back the pin rocks in the notch 10 and accommodates this forward and back movement. These movements may be made simultaneously without disturbing the relation. Consequently there is a definite locking of the lever against turning on its axis and complete freedom in the rocking of the lever in all directions. Preferably the ends of the pin 12 are bottomed slightly before the shell 5 is bottomed on the shoulder 9 so that there is a slight initial pressure on the pin holding it through the elasticity of the rubber in engagement with its seat.

What I claim as new is:—

1. In a lever mounting, the combination of a lever; a support having a lever opening therein receiving the lever; a universal joint between the lever and the support; and means locking the lever against rotation on its axis comprising a curved pin connected with the lever and support, said pin having sliding engagement in one connection to accommodate swinging movement of the lever in one direction and rocking engagement with the other connection to accommodate movement in another direction.

2. In a lever mounting, the combination of a lever; a support having a lever opening therein receiving the lever; a universal joint between the lever and the support; and means locking the lever against rotation on its axis comprising a curved pin having a sliding connection with the lever and a rocking connection with the support, the sliding movement of the lever along the curved pin accommodating the rocking movement of the lever in one direction and the rocking movement of the pin on the support accommodating the movement of the lever in a cross direction to the first-mentioned movement.

3. In a lever mounting, the combination of a lever; a support having a lever opening therein receiving the lever; a universal joint between the lever and the support; and means locking the lever against rotation on its axis comprising a curved pin curved with the center of oscillation of the lever as a center and connected with the support and lever, said pin having sliding engagement in one connection to accommodate swinging movement of the lever in one direction and rocking engagement with the other connection to accommodate movement in another direction.

4. In a lever mounting, the combination of a lever; a support having a lever opening therein receiving the lever; a universal joint between the lever and the support; and means locking the lever against rotation on its axis comprising a curved pin curved with the center of oscillation of the lever as a center and having a sliding connection with the lever and a rocking connection with the support, said rocking connection being abreast the center of oscillation.

5. In a lever mounting, the combination of a lever; a support having a lever opening therein receiving the lever; a universal joint between the lever and support comprising a rubber fulcrum accommodating the movement of the lever through the distortion of the rubber; and means locking the lever against rotation on its axis comprising a curved pin connected with the lever and support, said pin having sliding engagement in one connection to accommodate swinging movement of the lever in one direction and rocking engagement with the other connection to accommodate movement in another direction.

6. In a lever mounting, the combination of a lever; a support having a lever opening therein receiving the lever; a universal joint between the lever and support comprising a rubber fulcrum accommodating the movement of the lever through the distortion of the rubber; and means locking the lever against rotation on its axis comprising a curved pin having a sliding connection with the lever and a rocking connection with the support, the sliding movement along the curved pin accommodating the rocking movement of the lever in one direction and the rocking movement of the pin accommodating the movement of the lever in a cross direction to the first-mentioned movement.

7. In a lever mounting, the combination of a lever; a support having a lever opening therein receiving the lever; a universal joint between the lever and support comprising a rubber fulcrum accommodating the movement of the lever through the distortion of the rubber; and means locking the lever against rotation on its axis comprising a curved pin curved with the center of oscillation of the lever as a center and having a sliding connection with the lever and a rocking connection with the support, said rocking connection being abreast the center of oscillation.

8. In a lever mounting, the combination of a lever; a support having a lever opening therein receiving the lever; a universal joint between the lever and the support comprising a rubber fulcrum accommodating the movement of the lever through the distortion of the rubber; and means locking the lever against rotation on its axis comprising a curved pin having a sliding connection with the lever and a rocking connection with the support, the sliding movement along the curved pin accommodating the rocking movement of the lever in one direction and the rocking movement of the pin accommodating the movement of the lever in a cross direction to the first-mentioned movement, said rocking connection being under initial pressure through the elasticity of the rubber.

In testimony whereof I have hereunto set my hand.

HUGH C. LORD.